(12) United States Patent
Brown

(10) Patent No.: US 6,733,577 B1
(45) Date of Patent: May 11, 2004

(54) LIQUID POLISH

(76) Inventor: William Ervin Brown, 736 Greenway Pl., Daytona Beach, FL (US) 32114

( * ) Notice: Subject to any disclaimer, the term of this patent is extended or adjusted under 35 U.S.C. 154(b) by 0 days.

(21) Appl. No.: 08/800,809

(22) Filed: Feb. 18, 1997

(51) Int. Cl.⁷ .............. C09G 1/02; C09G 1/08
(52) U.S. Cl. .............. 106/3; 106/11; 106/10; 51/305; 51/306; 51/308; 51/307
(58) Field of Search .............. 106/3, 11, 10; 51/305, 306, 307, 308

(56) References Cited

U.S. PATENT DOCUMENTS

| | | | | | |
|---|---|---|---|---|---|
| 40,082 A | * | 9/1863 | Pratt | | |
| 910,569 A | * | 1/1909 | Peco | ............ | 51/305 |
| 1,153,086 A | * | 9/1915 | Hupe | | |
| 3,447,935 A | * | 6/1969 | Marley et al. | ............ | 106/10 |
| 4,064,061 A | * | 12/1977 | Henry | ............ | 252/91 |
| 4,308,060 A | * | 12/1981 | Talbot | ............ | 106/9 |
| 4,853,000 A | * | 8/1989 | Potter | ............ | 51/309 |

* cited by examiner

Primary Examiner—C. Melissa Koslow

(57) ABSTRACT

The invention pertains to a liquid polish for metals, glass, plastics and their derivatives: the novel liquid polish reduces application and buffing time significantly compared to prior art polishes using animal fat, glycerides, oils, wetting agents or tallow and uses unique compounds for increasing contact between the abrasive oxides within said liquid polish and surface contaminants of polished materials.

1 Claim, No Drawings

LIQUID POLISH

BACKGROUND OF THE INVENTION

1. Field of the Invention

The present Invention relates to a polish for metals, glass, plastics and their derivatives. More specifically, the present invention relates to a polishing liquid for metals and alloys, glass, plastics and their derivatives.

2. Prior Art

In order to provide background information so that the invention may be completely understood and appreciated in its proper context, reference may be made to the prior art patents and publications as follows: U.S. Pat. No. 4,561,895 to Eriksson discloses a non-abrasive metal polish or cleaning agent for objects. The polish is characterized by a combination of nitric acid and thiourea. The present invention distinguishes therefrom by being based upon the abrasive action of metal oxides and fumed silica.

U.S. Pat. No. 4,853,000 to Potter discloses an improvement which aids in polishing metals such as aluminum, magnesium, gold, silver brass copper and stainless steel. References cited in this patent are U.S. Pat. Nos. 40,082, 910,588, 1,153,086, 4,064,061 and 4,308,060, among others. The present invention distinguishes therefrom as will be made apparent by not using flour component,animal fats, tallow glycerides, process oils and wetting agents which coat the abrasive oxides within the polish and limit their polishing action. The present invention does not use any of these substances.

Whatever the precise merits, features and advantages of the above cited references, none of these achieves or fulfills the purposes of the present invention.

Accordingly, it is a principal object of the present invention to provide a liquid polish that will enable a means for achieving superior polishing of metals such as but not limited to aluminum, stainless steel, iron, steel, copper, brass, gold, silver, platinum, and tin., glass, plastics such as but not limited to lexan, plexiglass, mylar, nylon, PVC, formica and their derivatives through the application of a minimum of effort through physical rubbing, or buffing, by the use of the liquid polish.

SUMMARY OF THE INVENTION

In fulfillment and implementation of the previously recited objects, a primary feature of the invention resides in the provision of a unique combination of ingredients, comprised of metal oxide abrasives, fumed silica and a liquid carrier which provides optimal coupling between the abrasives within a liquid polish and the surface of glass, metals, plastics and their derivatives being polished.

A more specific feature resides in the inclusion of a unique combination of compounds that effectively provide a reduction of the electrostatic atomic and molecular binding forces between the oxides and other surface coating contaminants and the materials to be polished.

It will, therefore, be appreciated that, by virtue of the reduction of the electrostatic coupling forces between the surface coating contaminants and the materials to be polished, the abrasive action of the active ingredients in this liquid polish are more easily able to dislodge the contaminating surface substances from the materials being polished.

It will be understood, then, that a specific feature of this present invention is to provide a liquid polish that removes surface contaminants more readily and with less effort on the part of the user than any prior art in the liquid polish category.

DESCRIPTION OF THE PREFERRED EMBODIMENTS

A liquid polish consisting of aluminum oxide, chromium oxide, fumed silica, refined wax and mineral spirits.

The most preferred embodiment of the liquid polish is a mixture comprised of about 75% aluminum oxide, 10% refined wax, 5% chromium oxide, 10% fumed silica. A 25% volume of this mixture is compounded with a 75% volume of mineral spirits. approximately This unique combination of ingredients acts to reduce the electrostatic attraction of the atoms and molecules within the oils, waxes and other petroleum based compounds that can coat and lubricate and, thus, inhibit the direct abrasive action of the abrasive oxides upon the corrosion and other surface contaminants desired to be removed from the surface of the metal, glass, plastics and their derivatives desired to be polished.

Specifically, the avoidance of animal fats, glycerides, oils tallow and other substances in the liquid polish which is the subject of this invention makes said invention far superior to any polish that contains these substances, for these compounds lubricate, and thus, reduce the contact between the abrasive oxides within a polish and the surface being cleaned and polished.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

I claim:

1. A liquid consisting of aluminum oxide, chromium oxide, fumed silica, refined wax and mineral spirits.

\* \* \* \* \*